Figure 1:
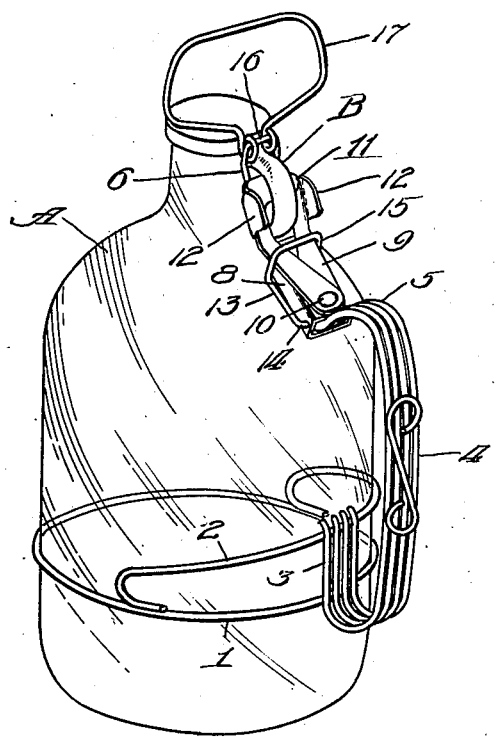

Nov. 3, 1942.  T. H. JENKINS  2,300,745

POURING HANDLE AND CARRIER FOR JUGS AND THE LIKE

Filed Aug. 10, 1940

Inventor:
Tazewell H. Jenkins,
by Wm. F. Freudenreich, Atty.

Patented Nov. 3, 1942

2,300,745

UNITED STATES PATENT OFFICE 2,300,745

POURING HANDLE AND CARRIER FOR JUGS AND THE LIKE

Tazewell H. Jenkins, Chicago, Ill.

Application August 10, 1940, Serial No. 352,061

7 Claims. (Cl. 215—100)

In my prior application, Serial No. 338,486, I have disclosed a device serving both as a carrier and as a pouring handle for a large bottle or the like. The particular device illustrated in that application is designed for use on plain bottles or other necked containers. There are other kinds of bottles, jugs or containers that are provided with eyes or jug handles which are adapted to be engaged either by the fingers of a user or by the hooked ends of a bail; and one object of the present invention may be said to be to adapt the invention of the aforesaid application to this latter type of container in a manner to make use of the eye, perforated ear, or jug handle on the container.

Viewed in a broad aspect, the present invention may be said to have for its object to facilitate the handling of large bottles or containers provided with jug handles or the like, to permit pouring therefrom in the manner of a pitcher and the carrying about of the containers while suspended from bails.

In carrying out the present invention, I employ a large ring or band, or other suitable member, adapted to be dropped down upon or applied to the body portion of the container, a stiff handle rising from such member transversely to the plane of the latter, and means to connect the free end of the handle to the upper part of the container. In the present form of my invention, instead of providing a second ring to surround the neck of the container, use is made of fingers or grippers that engage with an eye or jug handle on the container and tightly secure the upper end of the handle thereto; suitable latch or locking means being provided to prevent the accidental release of the device from the container; and there being on the upper end of the handle a suitable bail to be grasped in the handle for carrying the container about.

Often these jug-like containers are employed for holding acids or other liquids that are corrosive and which should therefore not come in contact with the hands of the user or with metal attachments serving as handles or carriers. By utilizing an ear-like part for attachment of the upper or free end of the pouring handle, all of the metal at the mouth of the container lies diametrically opposite the point at which the liquid issues from the container in the act of pouring, so that no liquid can come in contact with any part of the attachment unless liquid be allowed to run down the side of the container until it reaches the lower member that embraces the container; this latter being something that can occur only through carelessness on the part of the user. Therefore, viewed in one of its aspects, the present invention may be said to have for its object to produce a simple and novel pouring handle and carrying attachment for a container, no part of which lies in the path or at all near a stream of liquid poured from the container, or even drippings upon placing the container upright after pouring ceases.

Figure 2:
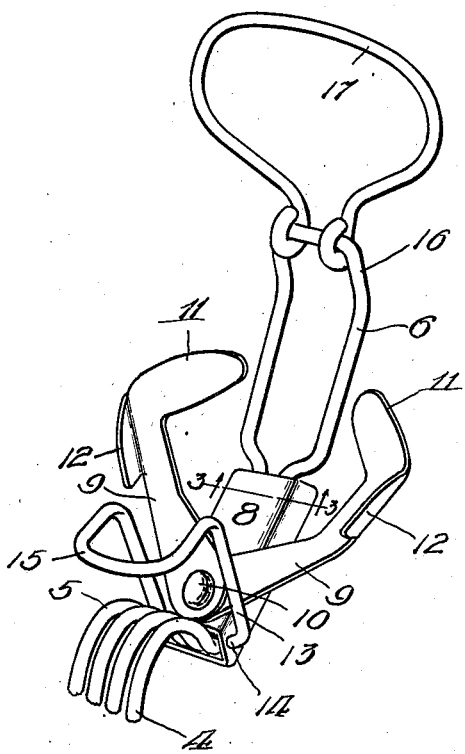
Figure 3:
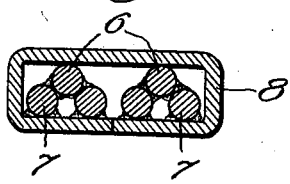

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a perspective view of a jug or bottle having one of my improved attachments applied thereto; Fig. 2 is a perspective view of the upper or free end of the handle member of the attachment, on a larger scale, showing the grippers open and the device separated from the bottle; and Fig. 3 is a section on line 3—3 of Fig. 2.

Referring to the drawing, A represents a bottle, jug or other container which is usually of the necked type; the container being provided with at least one element B which may be termed an eye, a perforated ear, or a jug handle. The foundation of the improved carrying and pouring device comprises a member to embrace the body of the bottle or other container, far down on the latter, and a rigid handle rising from such member. The container-embracing member may conveniently consist of a ring large enough to be dropped loosely down over the container. In the arrangement shown, this member is composed of a wire ring 1 and a segmental wire 2 properly shaped and welded to the ring proper to give a band-like effect to the embracing member. The handle is preferably in the form of a long flat bar suitably bent into the shape of a U, one arm 3 of which extends transversely of and is welded to the ring and the wire 2, while the other arm 4 is elongated in the upward direction so as to extend upwardly in spaced relation to a bottle to which the attachment is applied. The upper end of the bar is preferably curved forwardly and downwardly, as indicated at 5, to bring it into contact with or close to the shoulder of a bottle or jug and thus close the upper end of the handle in the same manner as the cross member of the U closes the lower end. The handle may conveniently be formed of a group of parallel wires united by welding, whereby there is obtained the effect of a fairly thin, flat bar.

The upper end of the handle terminates in a long, more or less rectangular loop 6 to provide a window or opening through which the eye B may extend. In other words, when the attachment is applied to a bottle or a jug, the large ring or band slips down over the body portion until the loop 6 registers with the eye or jug handle which then enters the loop and holds the attachment against moving farther down, and also holds it against shifting angularly about the bottle or jug. The loop 6 may conveniently be formed of wire and overlap a more or less straight section 7 of the handle which extends upwardly and forwardly from the curved part 5; the loop being welded to the wires of the handle proper and the overlapping portions being surrounded by a sheathing 8 which may be simply a metal plate folded around the same.

For the purpose of securing the attachment to the container, suitable means are provided to lock the loop 6 to the eye. In the arrangement shown, this means comprises a pair of gripper fingers 9, 9 connected to the sheathing or shell 8 at their lower ends by a rivet 10. Each gripper or finger has a part 11 projecting laterally from the free end thereof toward the cooperating gripper or finger. The parts are so proportioned that when the fingers are spread apart, they do not obstruct the opening in the loop and, therefore, the eye or jug handle can be inserted in this opening while the fingers are spread apart. After the attachment has been placed on the bottle, while the grippers are in the position illustrated in Fig. 2, and the eye or jug handle has passed through the loop, the fingers are pressed toward each other so that the two projections enter the eye from opposite sides, as shown in Fig. 1, thereby locking the attachment to the container. The finger pieces or grippers are preferably provided with ears 12 projecting rearwardly from the planes thereof, to enable the user more easily to grasp the fingers to move them between their locking positions and idle positions.

Although the gripper fingers will probably remain in their locking or holding positions, due to frictional resistance to movement thereof, I prefer to provide means positively to secure them in their locking positions. In the arrangement shown, the locking device for the gripping fingers is a latch 13 composed of a piece of wire bent into a U shape; the free ends 14 of the wire being bent inwardly and laterally and passed through holes in the side of the sheathing or shell 8 so as to serve as journals upon which the latch may turn. The U-shaped member is bent transversely at some distance from its closed end so as to provide a deep arch 15 which stands at right angles to the plane of the legs of the U. This arrangement permits the latch to be swung down, when the gripping fingers are in their locking positions as in Fig. 1, until the main portions of the legs of the U lie on opposite sides of the shell 8, as in Fig. 1, while the arch straddles the gripping fingers and prevents them from spreading apart.

The loop 6 is preferably bent along a transverse line so that a section 16 toward the free end is approximately vertical when the attachment is on the bottle. The parts are so proportioned that that portion of the rigid handle bar or member beyond the curved section 5 follows along the shoulder of the bottle or jug to the neck and then continues vertically to the top of the container, with the more or less vertical section 16 of the loop lying close to the neck. Therefore, by engaging a bail 17 with the cross bar of the loop 6 at the upper or free end, it is located near enough to the axis of the container to permit the container to be carried about by means of this bail, without giving an objectionable tilt to the container. When it is desired to pour from the container, the bail 17 is swung back out of the way, usually until it drops down upon the gripping fingers. Then, after removing the cap or stopper from the container, the part 4 or handhold of the device is gripped at such a point along its length as to bail the container and its contents and permit the container to be tilted in one direction or the other almost without effort. By making the handhold section of the device long, it is not necessary that the supporting hand always be in the same position relatively to the container, for the hand may be slipped lengthwise of the handhold in either direction to create or maintain a balance or any desired degree of unbalance, so that pouring is always easy. In pouring, the liquid emerges from the mouth of the container at a point remote from any part of the attachment and, regardless of what the liquid is, there is no danger of injuring the attaching device through contact therewith while pouring. This, as heretofore stated, is of importance in a case of containers filled with acids or other liquids having a detrimental effect on metal.

While I have illustrated and described with particularity only the single preferred form of my invention, I do not desire to be limited to the exact structural details thus illustrated and described; but intend to cover all forms and arrangements which come within the definitions of my invention constituting the appended claims.

I claim:

1. An attachment for a container having an eye toward the upper end, comprising a member adapted to embrace the body of the container, a stiff handle attached at one end to said member and projecting transversely to the plane thereof, means at the other end of the handle to engage the eye of the container, and a container-carrying bail attached to the latter end of the handle.

2. An attachment for a container having an eye toward the upper end, comprising a member adapted to embrace the body of the container, a stiff handle attached at one end to said member and projecting transversely to the plane thereof, said handle having an opening at its other end to receive said eye, and an element mounted on the handle near said opening for movements into and out of the said eye.

3. An attachment for a container having an eye toward the upper end, comprising a member adapted to embrace the body of the container, a stiff handle member secured at one end to said member and arranged at right angles to the latter, said handle member having at the other end an opening to receive said eye, and gripper fingers movably mounted on the handle near said opening so as to permit them to be inserted in said eye from opposite sides of the latter.

4. An attachment for a container having an eye toward the upper end, comprising a member adapted to embrace the body of the container at a considerable distance below said eye, a long stiff handle connected at one end to said member, gripper fingers lying flat on the other end of said handle, means securing said fingers to the handle for swinging movements relative to each other in approximately the plane of the handle, said fingers being adapted to enter said eye from opposite sides thereof.

5. An attachment for a container having an eye toward the upper end, comprising a member adopted to embrace the body of the container at a considerable distance below said eye, a long stiff handle connected at one end to said member, gripper fingers lying flat on the other end of said handle, means securing said fingers to the handle for swinging movements relative to each other in approximately the plane of the handle, said fingers being adapted to enter said eye from opposite sides thereof and being constructed and arranged to cross each other within said eye.

6. An attachment for a container having an eye toward the upper end, comprising a member adapted to embrace the body of the container at a considerable distance below said eye, a long stiff handle connected at one end to said member, gripper fingers lying flat on the other end of said handle, means securing said fingers to the handle for swinging movements relative to each other in approximately the plane of the handle, said fingers being adapted to enter said eye from opposite sides thereof, and means to lock said grippers with their free ends, in overlapping relation to each other, against spreading apart.

7. An attachment for a container having an eye toward its upper end comprising a ring adapted to embrace the body of the container at a considerable distance below said eye, a long, wide, flat handle attached at one end to the ring and extending transversely to the plane of the latter, and a pair of flat, L-shaped gripper fingers lying flat upon the other end of the handle and so pivoted thereto at corresponding ends as to permit the fingers to swing toward and from each other and to bring their free ends into overlapping relation to each other.

TAZEWELL H. JENKINS.